United States Patent
Ratan et al.

(10) Patent No.: US 11,661,340 B2
(45) Date of Patent: May 30, 2023

(54) SCALABLE HEAT EXCHANGER REFORMER FOR SYNGAS PRODUCTION

(71) Applicant: TECHNIP ENERGIES FRANCE, Nanterre (FR)

(72) Inventors: Sanjiv Ratan, Claremont, CA (US); Stephane Walspurger, Amstelveen (NL); Antonio Farace, Delft (NL)

(73) Assignee: TECHNIP ENERGIES FRANCE, Nanterre (FR)

( * ) Notice: Subject to any disclaimer, the term of this patent is extended or adjusted under 35 U.S.C. 154(b) by 617 days.

(21) Appl. No.: 16/467,910

(22) PCT Filed: Dec. 8, 2017

(86) PCT No.: PCT/EP2017/082068
§ 371 (c)(1),
(2) Date: Jun. 7, 2019

(87) PCT Pub. No.: WO2018/104526
PCT Pub. Date: Jun. 14, 2018

(65) Prior Publication Data
US 2020/0010318 A1    Jan. 9, 2020

(30) Foreign Application Priority Data

Dec. 8, 2016 (EP) ..................... 16203017

(51) Int. Cl.
*C01B 3/38* (2006.01)
*B01J 4/00* (2006.01)
(Continued)

(52) U.S. Cl.
CPC ............... *C01B 3/384* (2013.01); *B01J 4/002* (2013.01); *B01J 19/0013* (2013.01);
(Continued)

(58) Field of Classification Search
CPC ...................................................... C01B 3/384
See application file for complete search history.

(56) References Cited

U.S. PATENT DOCUMENTS

| 4,882,125 A | 11/1989 | Smith et al. |
| 4,919,844 A | 4/1990 | Wang |
(Continued)

FOREIGN PATENT DOCUMENTS

| EP | 0171786 A2 | 2/1986 |
| WO | 03/033134 A1 | 4/2003 |
| WO | 2010122031 A1 | 10/2010 |

OTHER PUBLICATIONS

PCT International Search Report and Written Opinion dated Feb. 23, 2018, issued in PCT International Patent Application No. PCT/EP2017/082068.

*Primary Examiner* — Paul A Wartalowicz
(74) *Attorney, Agent, or Firm* — Locke Lord LLP; Alan B. Clement; Alicia J. Carroll

(57) ABSTRACT

Heat exchanger-reformer for use in a hydrogen production plant for producing syngas, for instance by means of a steam methane reforming method, wherein the reformer comprises vessel with a first inlet for supplying feed and a second inlet for supplying hot reformer effluent, preferably coming from a main steam methane reformer, wherein the heat exchanger-reformer further comprises a heat exchanging section that is arranged in fluid connection with the first and second inlets for exchanging heat between the feed and reformer effluent to effectuate steam reforming of hydrocarbon to produce syngas, wherein the heat exchanging section comprises a plate heat exchanger assembly for heat exchange between said feed and said reformer effluent.

27 Claims, 7 Drawing Sheets

(51) Int. Cl.
*B01J 19/00* (2006.01)
*B01J 19/24* (2006.01)

(52) U.S. Cl.
CPC ........... *B01J 19/245* (2013.01); *B01J 19/249* (2013.01); *C01B 3/382* (2013.01); *B01J 2219/00085* (2013.01); *C01B 2203/0233* (2013.01); *C01B 2203/0833* (2013.01); *C01B 2203/1241* (2013.01); *C01B 2203/142* (2013.01)

(56) References Cited

U.S. PATENT DOCUMENTS

| | | | |
|---|---|---|---|
| 2009/0104488 A1* | 4/2009 | Gruss | F28D 9/0037 422/600 |
| 2009/0293359 A1* | 12/2009 | Simmons | C01B 3/34 48/209 |
| 2012/0061619 A1* | 3/2012 | Fernie | C01B 3/384 252/373 |
| 2015/0010874 A1* | 1/2015 | Ghazvini | F24H 1/0045 431/170 |

* cited by examiner

SCALABLE HEAT EXCHANGER REFORMER FOR SYNGAS PRODUCTION

CROSS REFERENCE TO RELATED APPLICATIONS

This application is a 371 U.S. National stage application of International PCT Patent Application No. PCT/EP2017/082068, filed on Dec. 8, 2017, which claims priority to European Patent Application No. EP 16203017.5 filed Dec. 8, 2016, entitled SCALABLE HEAT EXCHANGER REFORMER FOR SYNGAS PRODUCTION. The entire contents of these applications are incorporated herein by reference in their entirety.

FIELD OF THE INVENTION

The present invention relates to a heat exchanger reformer for convective steam reforming of a hydrocarbon feed, in particular light hydrocarbons utilizing the heat of reformed gas stream. The heat exchanger reformer may be used for instance as a heat exchanger reformer, i.e. in parallel to a conventional steam reformer, or in parallel to an auto-thermal reformer or partial oxidation reactor, in the production of hydrogen, syngas, methanol and/or ammonia. The heat exchanger contains a catalyst in its preferred embodiment but may also simply be a heat exchanger that ensures heat transfer from hot reaction product from the outlet of a reformer to the feed gas pre-heated upstream the inlet of such a reformer. The plate assembly design and configuration replaces the conventional tubular bundle and its associated tube-sheet, thus also eliminating the related scale-up limitations, while also simplifying significantly the construction and the strategy used for the prevention of carburization or so called metal dusting.

BACKGROUND

The most prevalent process for producing syngas and hydrogen is steam reforming of natural gas and other light hydrocarbons at high temperatures in the presence of a catalyst. The reaction being highly endothermic, it is favored by high temperatures inherently requiring substantial heat to achieve the desired conversion. Such temperatures are typically achieved by input of external heat, often through fuel firing in a radiant box furnace with catalyst—filled tubes known as steam reformer. The reformed gas is an equilibrium mixture of hydrogen, carbon monoxide, carbon dioxide together with unconverted methane and excess steam.

In the known instances of heat exchange or gas heated steam reforming, the concept is to minimize the amount of firing per unit reformed gas or achieve additional reforming for a given firing duty by using the heat of the reformed gas leaving the fired reformer for reforming part of the feed in a heat-exchanger type reformer, termed here as heat-exchanger-reformer. This is for example disclosed in U.S. Pat. No. 4,919,844. In this known heat exchanger-reformer, the catalyst-filled multiple tubes are mounted as a bundle on a circular tube-sheet at the top and in some cases also at the bottom, and placed in a vertical cylindrical shell, having the heating gas flowing on the shell side. Such equipment has been successfully implemented for the purpose of capacity of existing steam reformers for the synthesis of pure hydrogen and heat exchanger in applications involving higher temperature reformed gas stream as heat source e.g. involving secondary reforming or auto-thermal reforming.

However, the design and configuration of the above described conventional heat-exchanger-reformer comprising a tube bundle and a tube sheet, impart unwanted limitations to the scaling-up and fabrication possibilities, beyond a certain tube-sheet diameter and thickness. Furthermore, the equipment size is typically governed by the heat exchange surface area available, since the process is limited by heat transfer in most cases. The shell and tube configuration is therefore a suitable option but not the best option to optimize the equipment size and increase the throughput capacity of a single equipment.

Besides this, with process heat recovery from the reformed gas, the stream passes through the temperature window where the undesired phenomenon of 'metal-dusting' can potentially occur. Metal dusting is a catastrophic corrosion observed in high alloy materials handling syngas in the typical temperature range of 450-750° C., depending on severity related to partial pressure of carbon monoxide (CO) and hydrogen ($H_2$) in the syngas. As a result, the heat exchanger-reformer needs to be protected against metal dusting by either producing the equipment from a special metal dusting resistant material such as high nickel, high chromium alloys, optionally promoted with alloying elements that contribute to the metal resistance or by coating the base metal with a protective coating using specialized coating methods.

There is thus a need for an improved post-heat exchanger-reformer for recuperative steam reforming that can more effectively overcome the above described limitations, shows a wider scalability for covering larger syngas capacities.

Therefore, it is an object of the present invention to provide an improved heat exchanger-reformer for recuperative steam reforming that can more effectively overcome the limitations of the prior art devices outlined above, and has the advantage of a wider scalability for covering larger syngas capacities and/or larger heat transfer surface with reduced fabrication complexity and longer better mechanical integrity.

SUMMARY OF THE INVENTION

This is achieved according to the present invention with a heat exchanger reformer which shows the technical features of the characterizing portion of the first claim.

Thereto, the present invention relates to a heat exchanger reformer for convective steam reforming of a hydrocarbon feed, wherein the heat exchanger reformer comprises a vessel having a plate assembly section placed therein comprising of several plates positioned at a distance from each other to provide at least alternating first and second channels between adjacent plates, which vessel comprises a first inlet at a first end of the plate assembly section for supplying a mixture of a hydrocarbon feed and steam to the first channels and causing the mixture to flow in a direction toward a second end of the plate assembly section, which vessel also comprises a second inlet close to the second end of the plate assembly for supplying hot reformer effluent as a heating gas flow to the second channels, wherein the second channels comprise a connected first and a second section, wherein the first section is provided for conducting the hot reformer effluent in a direction towards the first end of the plate assembly counter current to the flow of the hydrocarbon feed and steam mixture and the second section is provided for conducting the hot reformer effluent to flow in cross direction of the first channels, which second channels are connected to a collector outlet for the reformer effluent to leave the heat exchanger reformer at the first end of the plate assembly.

According to the present invention "hydrocarbon feed" means a gas mixture which may contain light hydrocarbons and/or natural gas.

The presence of a plate assembly section comprising of several plates positioned at a distance from each other to provide alternating first and second channels between them, not only allows optimized spacing and heat transfer by tuning the surface to volume ratio, but also permits simplifying construction and size scale-up compared to prior art devices, due to improved geometrical flexibility and simplification in the plate assembly layout. In the heat exchanger reformer of the present invention, the distance or gap or spacing between adjacent plates forming alternate first and second channels can vary and may be optimized by the skilled person based on the design parameters in terms of actual volumetric flow, catalyst geometry and volume as well as in terms of optimizing heat transfer against pressure drop. In particular, the plate assembly is designed for differential pressure in parity between the first channel and the steam reformer pressure drop (typically 2-4 bar) when the heat exchanger reformer is applied in parallel to steam reformers or secondary reformers.

Furthermore the number of passes, i.e. the number of times the fluid on the cold side passes through the hot side and vice versa, may be varied as a function of the desired conversion and throughput against the pressure drop limitation and heat transfer requirements.

The present invention presents the additional advantage that the heat transfer coefficients of the plate heat exchanger are higher when compared to prior art devices, and as a consequence the surface area required for a given heat duty is one-half to one-third that of a shell-and-tube heat exchanger. Thus, costs, overall volume and maintenance may be reduced.

Also the application of a protective coating like aluminizing or special metal dusting resistant alloy is significantly simpler on a flat plate than on circular seamless tubes and curved surfaces and tube-to-tube sheet joints in prior art heat-exchanger-reformers. The plate assembly allows easier and less intricate welding areas, which otherwise can create stagnation pockets due to uneven surface and also cause potential disintegration of the protective coating, thus initiating nuclei for metal dusting. Thus the use of multiple flat plates permits a more robust protective coating in comparison to a similar treatment on circular tubes, tube sheets, shell side baffles or, axially finned tubes or any heat exchange surface enhancement device used in the prior art.

The use of a plate assembly further permits for easier deployment of improved future metal-dusting resistant alloy materials, which may be easier to deploy in plates than in tubes. The present invention thus allows achieving an improved material integrity and a better protection of the reactor surface against potential metal dusting.

The present invention therefore carries the major advantage of realization of potential cost reduction compared to prior art heat exchanger-reformers based on a simplified construction, more effective and easier protection against metal-dusting, higher scalability for larger application allowing improved economy of scale along simpler construction and logistics, further resulting in shorter implementation time, and moreover leading to easier and shorter maintenance operations.

In general, the collector outlet will be provided for conducting the reformer effluent to an outlet nozzle of the vessel.

The first channels may either be empty or they may contain a reforming catalyst.

In a preferred embodiment the plate assembly section is placed in an enclosing shell.

The distance or gap or spacing between adjacent plates forming alternate first and second channels, and optional third channel can vary and be optimized by the skilled person based on the design parameters in terms of actual volumetric flow, catalyst geometry and volumes as well as and optimizing of heat transfer against pressure drop.

Heat transfer rates and efficiency can be improved by implementing protrusions such as rectangular ridges or bars attached to one plate and protruding to contact the adjacent plate in the second channels. These protrusions have multiple purpose which serve not only as extended surface for enhancing heat transfer but more importantly may act as plate stiffeners and spacers for better mechanical rigidity, uniform gaps and avoidance of any buckling or deformation tendency of large flat plates. The protrusion may extend over the entire length of the plate co-current to reformed gas flow, and can be placed close enough thereby creating sort of flow channels for reformed gas flow.

According to another embodiment, heat transfer efficiency between the channels may be improved by the use of corrugated plates, having the corrugations in the flow direction of the hot reformer effluent.

According to a further preferred embodiment, heat transfer efficiency between the channels may be improved by the presence of at least one strip or ridge which protrudes from a side of the plate facing the second gas channel, which extends along the flowing direction of the hot reformer effluent. The presence of this ridge or space bar brings the additional advantage that it acts as a stiffener which improves the rigidity of the plates. This may be desirable in particular when the plates have relatively large dimensions. The at least one ridge may also function as a spacer for ensuring the presence of a gap with uniform dimensions over the whole surface of two adjacent plates thus forming flow slots or conduits. Besides this, the ridge may act as an extended surface of the heat exchanging area for providing enhanced heat transfer between the feed and reformer effluent.

In a preferred embodiment of the invention, the at least one ridge is provided to connect adjacent plates of the second channel along which heat exchange is ensured.

In a further preferred embodiment, the ridge preferably has a thickness in width direction of the second channel which is maximally half of the width of the second channel on each side. The ridge thus may extend in a direction substantially longitudinal, i.e. substantially parallel to the second reformer effluent channel.

In the heat exchanger reformer of the present invention, the first inlet will usually be positioned at some distance from the first end of the plate assembly.

Also, in the heat exchanger reformer of the present invention, the second channels will usually be empty to permit reformed gas flow there through and to provide heat transfer to the first channels for steam reforming or for pre-heating of a steam reformer feed.

The vessel may take any orientation considered suitable by the skilled person. In a preferred embodiment however, the vessel extends in upright direction, and in a further preferred embodiment the first channels and at least part of the second channels extend in upright direction as well. In such a device, the first inlet for supplying a mixture of a hydrocarbon feed and steam to the first upright channels will usually be located at a top position of the plate assembly and the mixture will be caused to flow in downward direction through the plate assembly section. In such a device further, the second inlet will be located at a second end of the plate assembly, at a position on the plate assembly section opposite that containing the first inlet, for supplying hot reformed gas.

In one embodiment of the invention the hot reformed effluent which is mixed with the reformed effluent exiting the first channels as heating gas flow to the second channels, in the vessel, and causing the reformer effluent to flow counter-currently, which second channels are connected to a second collector outlet for the reformed effluent to leave the heat exchanger-reformer at an extension of the second channels of the plate assembly, wherein at the position of the second collector outlet at least one collector is provided for conducting the reformer effluent to an outlet nozzle of the vessel before exiting the vessel through an outlet nozzle as a single product stream out of the heat exchanger reformer vessel.

In another embodiment of the invention the hot reformed effluent is collected in extended ducts at the first end of the plate assembly to leave the heat exchanger-reformer at an extension of the second channels of the plate assembly, while the reformed effluent exiting the first channels is collected at the second end of the plate assembly in a collector outlet to leave the heat exchanger-reformer at an extension of the first channels of the plate assembly, wherein at the extensions on both ends at least one collector is provided for conducting the effluents to two separate outlet nozzles of the vessel before exiting the vessel through their respective nozzle as two product streams out of the heat exchanger reformer vessel.

In still another embodiment of the invention the hot reformed effluent is collected in extended ducts at the first end of the plate assembly to leave the heat exchanger-reformer at a second extension of the second channels of the plate assembly, while the reformed effluent exiting the first channels is directed counter-currently by an additional channel or collector, positioned in the first channel—for example centrally of the first channel, that allow for additional heat transfer towards from the hot product towards the catalyst zone. The product flowing in the additional channel (or collector) placed in the first channel is collected in an extension to the additional channel at the first end of the plate assembly and leave the heat exchanger-reformer. The extensions of the second channel and of the central channel (or collector) are collected in at least two separate collectors at the first end of the plate assembly allowing to direct the two products to two separate outlet nozzles of the vessel before exiting the vessel through their respective nozzle as two product streams out of the heat exchanger reformer vessel.

Collection of the exit reformed gas flow after heat recovery preferably done by directing its flow in a direction crosswise to the flow direction in the first and second channels. Thereto, in a preferred embodiment the second channels comprise of two sections, wherein a first section is for conducting the flow of hot reformer effluent counter currently to the hydrocarbon and steam feed for heat transfer through the plates and a second shorter section with extended ducts of the second channels for directing the exit gas in cross flow to the first and second channels for collection in a chamber and then through exit gas collectors in a square cross section arrangement for final outflow from the heat exchanger reformer. This arrangement also permits optimum utilization of the shell heat exchanger.

In an embodiment, the vessel comprises a box positioned at the first end of the plate assembly, which box is provided with a plurality of supply holes at the position of the first channels for supplying feed mixture to the first channels. Thus, the use of a conventional tube-sheet can be avoided and the invention eliminates the related scale-up limitations and fabrication complexity of a prior art heat exchanger-reformer as described above.

In a preferred embodiment, the plate assembly comprises on opposite sides thereof, a first and a second end plate, which have a larger thickness in comparison to the plates taking an intermediate position between the first and second end plate. This way, the end plates form a strong enclosure for the plate assembly. In a further preferred embodiment, the plate assembly will be received in a peripheral frame, comprising a plurality of beams forming the frame, for sturdiness and for lifting and installation.

In case of a taller and narrower plate bundle, the plate assembly responsible for the exchanging of heat can be divided in two blocks, stacked on each other with channels aligned.

The exit gas configuration is currently conceptualized as two lateral opposite chambers with collector outlet pipes going down and connected to a transfer line.

In an embodiment, the plates may be coated with a protective coating to minimise the risk to unwanted corrosion. Thereto use can be made of a metal alloy, for example the alloy described in U.S. Pat. No. 4,882,125. In a further preferred embodiment of the invention, the respective plates of the plate heat exchanger assembly may be of a metal dusting resistant nickel-chromium alloy or even a ceramic material, such as silicon carbide based material, titanium oxide based materials, zirconium oxide based materials etc. . . . By using this specific alloy or ceramic material with its resistance to metal dusting, further treatment of the plates may not be necessary, which is advantageous in view of the complexity of manufacturing and thus in view of the costs for manufacturing thereof. However, any other protective coating considered suitable by the skilled person may be used as well.

The present invention provides the overall advantage that the use of a plurality of plates, positioned at a distance from each other to provide alternating channels for on the one hand receiving the catalyst for the steam reforming reaction, and on the other hand flowing the reformer effluent gas to provide additional heat, allows achieving improved material integrity with an improved resistance towards metal dusting. According to the inventors this must be attributed to a more effective coating protection that may be applied to plates, which is much more difficult to achieve with finned tubes or baffles. On the other hand, plates may be made of materials which are not available for the production of tubes, and therefore the plates may be made of for example Incoloy 693, which based on its resistance to metal dusting, do not necessitate the presence of protective coating as an advanced option.

For flow distribution at the second end of the plate assembly of the heat exchanger, a perforated plate is envisaged. The refractory shroud around the plate assembly could be hexagonal but may also be simply of squared or of rectangular shape.

The invention also relates to a method for producing hydrogen, preferably by means of steam methane reforming, wherein the method comprises a main steam methane reforming step in which hydrocarbon is reformed to produce hydrogen and a heat exchanger-reforming step in which hydrocarbon is reformed to produce additional hydrogen, wherein the heat exchanger-reforming step is carried out in a heat exchanger-reformer.

The aforementioned and other features and advantages of the invention will be more fully understood from the following detailed description of certain embodiments of the invention, taken together with the accompanying drawings, which are meant to illustrate and not to limit the invention.

Definitions

Throughout this description the term "feed" denotes a mixture of hydrocarbons and steam.

Reference throughout this specification to "one embodiment" or "an embodiment" means that a particular feature, structure or characteristic described in connection with the embodiment is included in at least one embodiment in the present invention. Thus, the appearances of the phrases "in one embodiment" or "in an embodiment" in various places throughout this specification are not necessarily all referring to the same embodiment. Furthermore, it is noted that particular features, structures or characteristics of one or more embodiments may be combined in any suitable manner to form new, not explicitly described embodiments.

BRIEF DESCRIPTION OF THE DRAWINGS

It is noted that identical or corresponding elements in the different drawings are indicated with identical or corresponding reference numerals.

DETAILED DESCRIPTION

Figure 1:
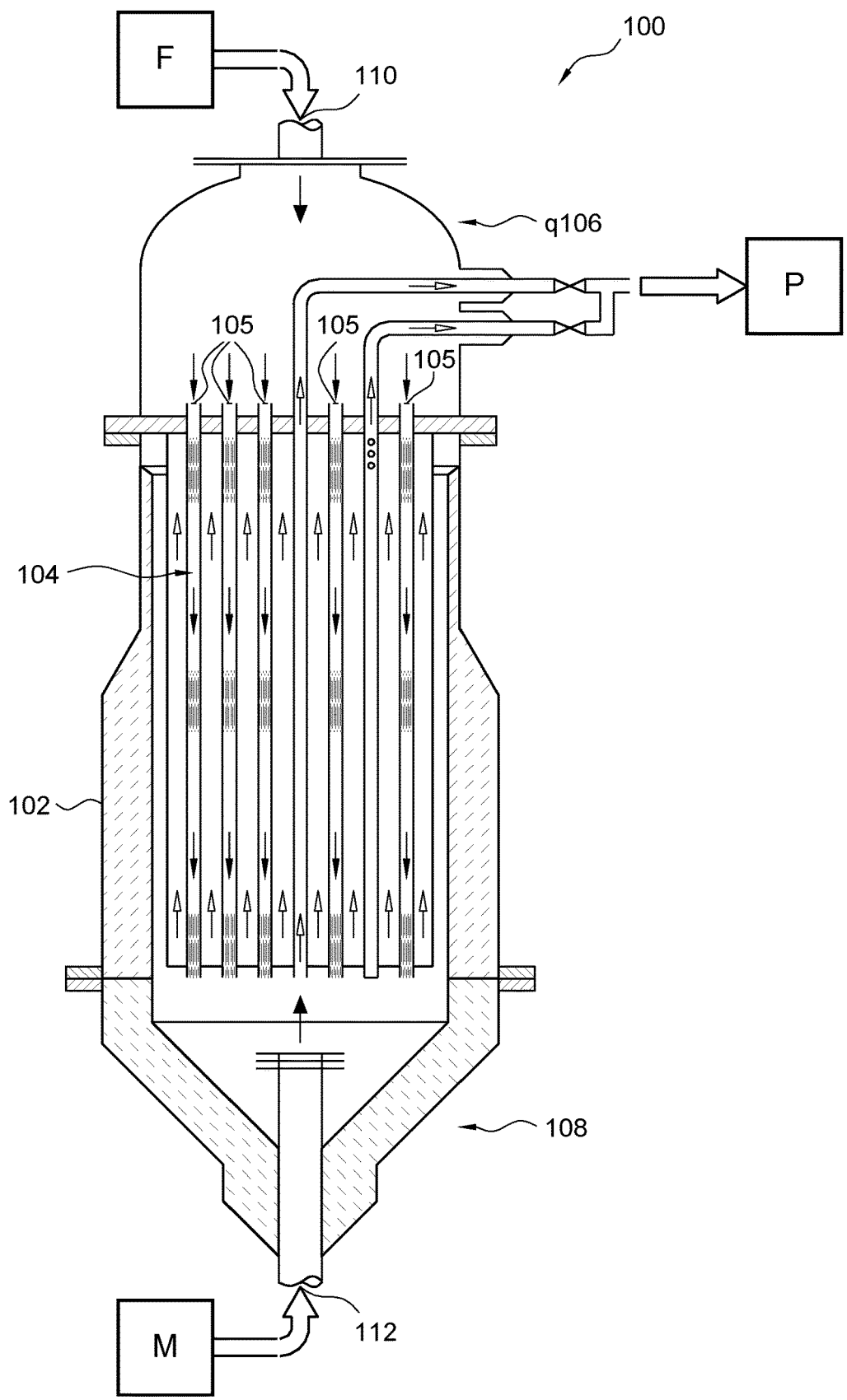
FIG. 1 shows a schematic diagram of a prior art heat exchanger reformer.

In FIG. 1, an example of a prior art heat exchanger reformer is shown. Such a heat exchanger-reformer may be used in a steam methane reforming method for producing hydrogen to increase the hydrogen production that is obtained by the main steam methane reformer. The prior art heat exchanger reformer 100 is configured for using heat of the steam methane reformer effluent coming from the main steam methane reformer. The heat exchanger reformer 100 as shown in FIG. 1 is of the tube bundle and tube sheet type.

The heat exchanger reformer 100 comprises a convective heat exchange reformer vessel 102 that houses an amount of catalyst filled tubes 104. The catalyst filled tubes extend from adjacent an upper side 106 of the vessel 102 towards a lower side 108 of the vessel 102. At the upper side 106 of the vessel 102, an inlet 110 for supplying feed and steam is provided that is in fluid connection with the inlet openings 105 of the catalyst filled tubes 104. Adjacent the lower side 108 of the vessel 102 a reformer effluent inlet 112 is provided that is in fluid connection with the main steam methane reformer M for supplying reformer effluent to the inner space of the vessel 102. The heat of the reformer effluent is used to enable the conversion of the feed and steam mixture inside the catalyst filled tubes 104 into a mixture at least comprising hydrogen, carbon monoxide and carbon dioxide. Preferably, the hot reformer effluent flows along the outer surface of the catalyst filled tubes 104 for efficient heat transfer to the feed and steam mixture inside the catalyst filled tubes 104. The catalyst filled tubes 104 may comprise finned external surfaces (not shown) for enhanced heat transfer capacity. The fins may be situated either longitudinally or transversely to the central axes of the tubes. The heat exchanger-reformer 100 further comprises an outlet for supplying the reformed reaction product P towards the water gas shift section, optionally through a process gas boiler. The heat exchanger-reformer 100 according to the prior art enables to achieve a significant (over 30%) production increase of the steam methane reforming plant while improving overall process efficiency. This may in turn lead to a lower amount of fuel burned and therefore into reduced CO2 emissions. However, as indicated before, the heat exchanger-reformer 100 according to the prior art may encounter scaling-up limitations and problems related to metal dusting and prevention measures.

These problems may be at least partly overcome by the heat exchanger-reformer 1, also called an enhanced heat transfer reformer, according to the invention of which preferred embodiment is shown in FIGS. 2-9.

Figure 2:
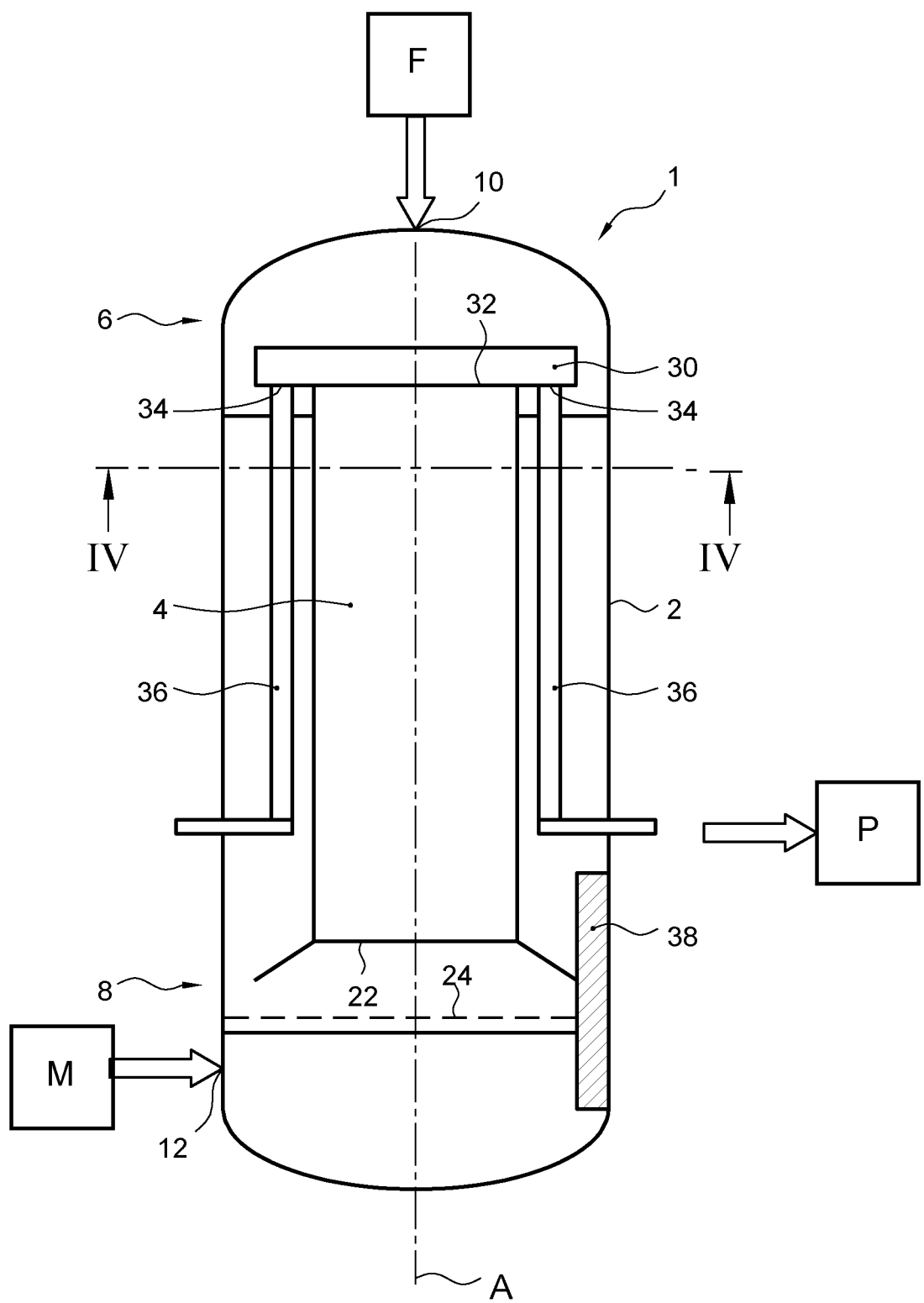
FIG. 2 shows a schematic diagram of an embodiment of the heat exchanger-reformer according to the invention.
Figure 3:
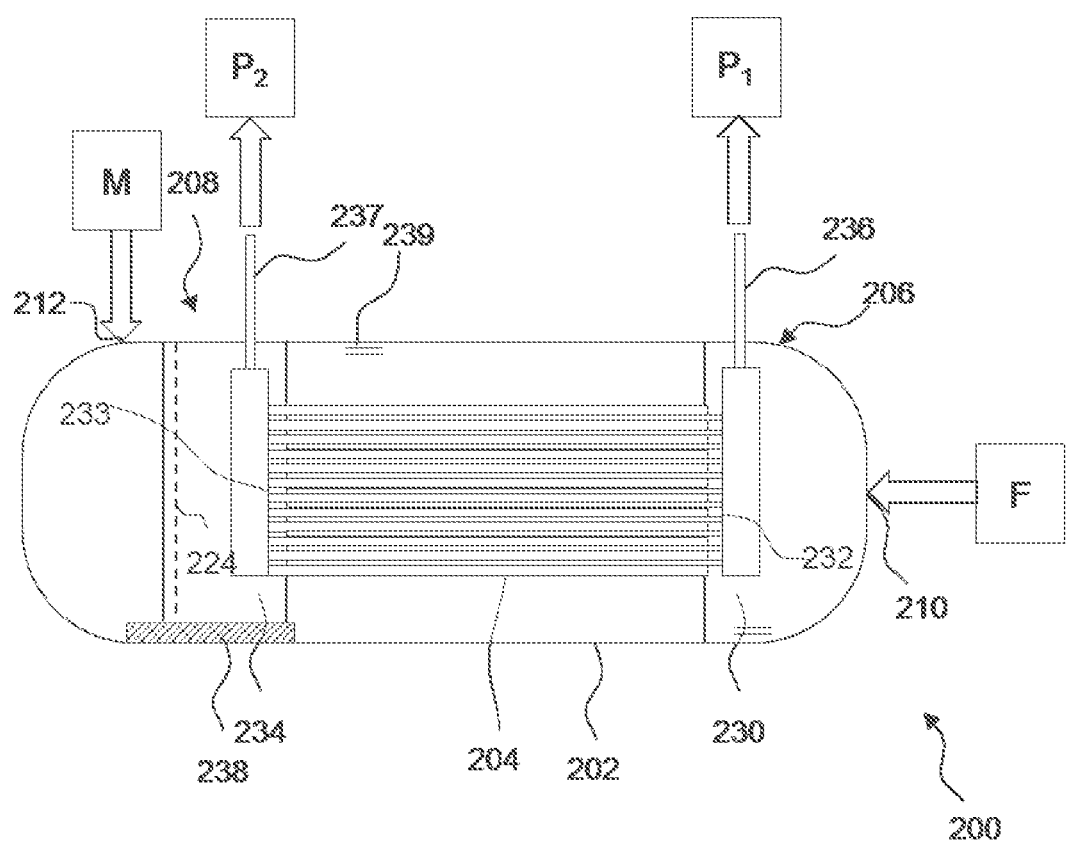
FIG. 3 shows a top view schematic diagram of another embodiment of the heat exchanger-reformer according to the invention.
Figure 4:
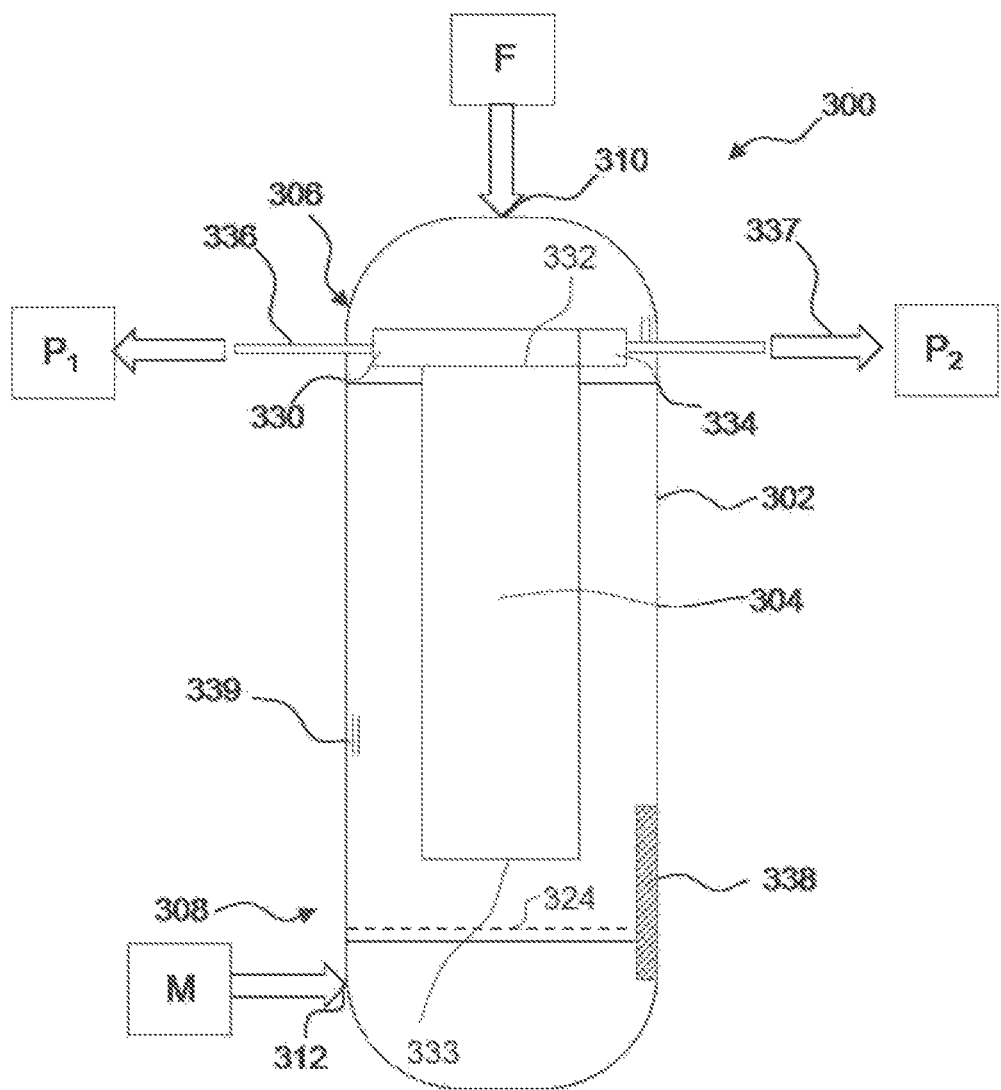
FIG. 4 shows a side view schematic diagram of still another embodiment of the heat exchanger-reformer according to the invention.
Figure 5:
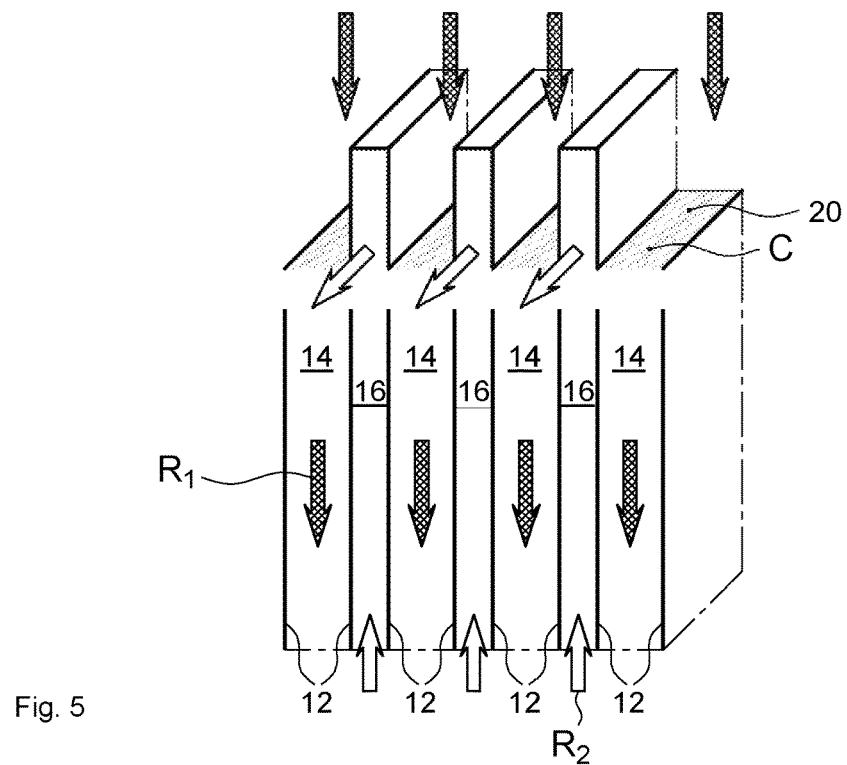
FIG. 5 shows a schematic perspective view of an upper part of the plate heat exchanger assembly of an embodiment of the heat exchanger-reformer according to the invention.
Figure 6:
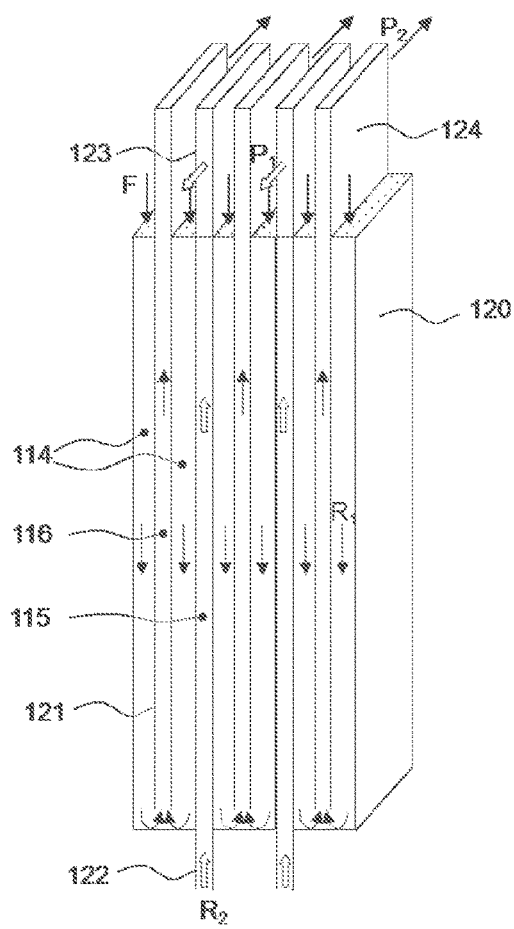
FIG. 6 shows a schematic perspective view of the plate heat exchanger assembly of another embodiment of the heat exchanger-reformer according to the invention.

The heat exchanger-reformers 1, 201 and 301 shown in FIGS. 2, 3 and 4 respectively may be used in a steam methane reformer method in which a main steam methane reformer M, i.e. the primary reformer of the steam methane reformer plant or the secondary reformer of the ammonia or methanol plant, is used for reaction of natural gas and other light hydrocarbons to react with water vapor at a high temperature in the presence of a reforming catalyst to release hydrogen. In the main steam methane reformer M the feed and part of the steam are converted into a mixture of hydrogen, carbon monoxide and carbon dioxide together with some remaining unconverted feed in the form of methane and remaining steam (the reformed gas) in a catalytic reaction. The reaction is highly endothermic and is carried out at high temperatures. The reformed gas which leaves the main steam methane reformer M has a high temperature, often around 860-950° C. or the secondary reformer at temperature between 900 and 1200° C.

The hot reformed gas is supplied to the heat exchanger reformer 1 according to the present invention to be used for heat exchange with the hydrocarbon feed stream which is subjected to steam reforming. The FIG. 2 represent an embodiment of the heat exchanger where the equipment is designed with a vertical layout. It should be noted that horizontal layout is possible as well.

The heat exchanger reformer 1 according to the invention comprises a vessel 2, in particular an upright vessel with an elongate cylindrical shape. The vessel 2 comprises a first inlet 10 along which a hydrocarbon feed and steam are supplied. The first inlet 10 is provided in an upper part 6 of the vessel 2.

The feed may comprise a mix of lighter hydrocarbons such as methane, ethane, propane and/or heavier hydrocarbons as naphtha. The feed and steam supply F may be any supply member considered suitable by the skilled person, and may for instance comprise a pipe grid or a storage tank. In a particularly preferred embodiment, the feed may bypass the main steam reformer. Before being supplied to the heat exchanger-reformer 1, the feed may be pre-treated to remove unwanted feed contaminants and the hydrocarbon feed may be mixed with steam.

A second inlet 12 for supplying reformed gas, or in other words hot reformer effluent is provided in a lower part 8 of the vessel 2. The second inlet 12 may be in fluid connection with the reformed gas outlet of the main steam methane reformer M to permit for a direct supply of reformer effluent (i.e. the reformed gas) from the main reformer, to the vessel 2 inner space.

Inside the vessel 2 a heat exchanging section is provided which should permit exchange of heat between the hydrocarbon feed and steam mixture which is supplied to an upper part of the vessel and the hot reformer effluent supplied to a lower part of the vessel. The feed and hot reformer effluent are provided to flow in counter-current direction.

The heat exchanging section comprises a plate heat exchanger assembly 4. The plate heat exchanger assembly 4 comprises several plates 12 positioned at a distance from each other to provide alternating first and second channels 14, 16 between adjacent plates (see also FIGS. 5, 7-9). The first channels 14 are configured for a feed and steam mixture flow in a first direction R1, said first direction extending from the first inlet 10 in an upper part of the vessel 2 in downward direction, in particular towards the lower end 8 of the vessel 2. The feed steam mixture flow may in particular run substantially parallel to a vessel central axis A. The second channels 16 are configured for a flow of reformer effluent in a second direction R2, opposite direction to the first direction R1. Thus, in use, the flow of reformer effluent through the plate heat exchanging assembly 4 is in counter flow with the feed and steam mixture flow.

The heat exchanger assembly 4 may comprise end plates 18 (see FIG. 8) that have a larger thickness than the intermediate heat exchanging plates 12 such that a strong enclosure is formed. Preferably, the plates of the plate heat exchanger assembly may be of a high nickel high chromium alloy which provides high resistance to metal dusting. The high chromium content in the alloy may provide excellent resistance to oxidation as well and a sufficient reserve of chromium to sustain the protective chromium layer. The addition of aluminium may improve the resistance to metal dusting by forming additional alumina based protective layer. The addition of copper promoter may also strengthen the solid solution and act as an inhibitor for the surface CO dissociation. Other elements have been found to contribute to the suppression of the metal dusting phenomenon.

Instead of providing the heat exchanger plates 12 of said high nickel-high chromium alloy, the heat exchanger plates 12 may be provided with protective coating on outer surfaces of each of the plates 12. Since the heat exchanging section comprises a plate heat exchanging assembly 4 having plates 12 with a relatively simple structure and shape, the coating of said plates may be easier than coating of the finned tubes of the described prior art reformer. Besides the quality of the coating on the plates may be better.

In the shown embodiment, the respective plates 12 of the plate heat exchanger 4 have a substantially similar dimensions and shape, the plates have for instance a square or rectangular shape, and dimensions. However, in a different embodiment the plates may have a different configuration and have different dimensions and shapes.

The plates 12 of the plate heat exchanger assembly 4 may on a side facing the second channel 16 be provided with at least one protrusion 26, which protrudes into the second channel 16 over at least part of the width of the second channel. Preferably the protrusions extend parallel to or along the flowing direction of the reformed gas, along at least part of the length of the plate 12. In a preferred embodiment, the plates 12 are corrugated (not shown) to extend the heat exchanging surface thereof. However, other technical features which permit to extend the heat exchanging surface may be provided as well.

The first channels 14 comprise at an opening thereof facing the first inlet 10 of the vessel 2 a catalyst channel inlet 20, for instance a diffuser type inlet (not shown). The flow distributor is designed such that the catalyst contained in the first channels is exposed to similar flowrates whatever the position of the plate in the plate assembly. The catalyst may be provided as pellets or as a coating on structured packing in the first channel or in the preferred embodiment as a coating directly on the plate surface to obtain the highest heat transfer efficiency.

The second channels 16 have an inlet opening 22 facing the reformer effluent inlet 8 (see FIG. 2) for receiving the reformer effluent flow. When flowing through the second channels 16, the hot reformer effluent will pass along the plates 12 and exchange heat with plates 12 and the feed/steam mixture flowing through channels 14. In order to have a suitable distribution of the reformer effluent inlet 8, a perforated plate 24 may be provided for finely dividing the reformer effluent flow towards the inlet openings 22 of the second channels 16 (see FIG. 2). Plate 24 may enable bottom mixed flow distribution. In a lower part 8 of the vessel 2, a refractory shroud 38, for instance a cylindrical or hexagonal shroud, may be provided.

The cross sectional dimension d of the first channels 14 which contain the catalyst (see FIG. 8) may be dependent on the cross sectional dimensions of the catalyst pellets C present in the first channel 14. However the catalyst may also be present as a coating on a structure with dimensions that match any distance d. Furthermore in a preferred embodiment the catalyst may be directly coated on the heat exchange plates that may offer enough geometrical surface for the catalyst to reach the desired conversion. Corrugated plates, fined plates and other heat transfer enhancement protrusion may also be used to increase the available geometrical surface area for the catalyst coating.

The cross sectional dimension D of the second channel for the reformer effluent 16 may be chosen dependent on the desired degree of heat recuperation. The plates 12 of the plate heat exchanging assembly 4 may be provided with at least one ridge 26 (see FIGS. 8 and 9), at least at a surface facing away from the feed flow channel 14, extending towards the adjacent plate 12 of the stack of plates. Thus, the ridge 26 may extend into the reformer effluent channel 16 and interconnect the adjacent plates 12. The ridge 26 may have a thickness t of approximately half the cross sectional dimension D of the reformer effluent channel 16. In the shown embodiment of the heat exchanger-reformer 1 according to the invention, multiple ridges 26 are provided at mutual distance. Such ridges 26 may for instance be connected to the respective plates 12 by means of a weld or braze connection. Instead these ridges may be formed in the plates 12 depending on the base material and/or the coating technology applied on thereof. The ridges 26 provide stiffness to the respective plates 12 and may also act as spacers between adjacent plates for maintaining uniform channel cross sectional dimensions d, D. Additionally, said ridges 26 may provide further enhanced heat transfer between the feed and steam mixture and the reformer effluent.

Figure 7:
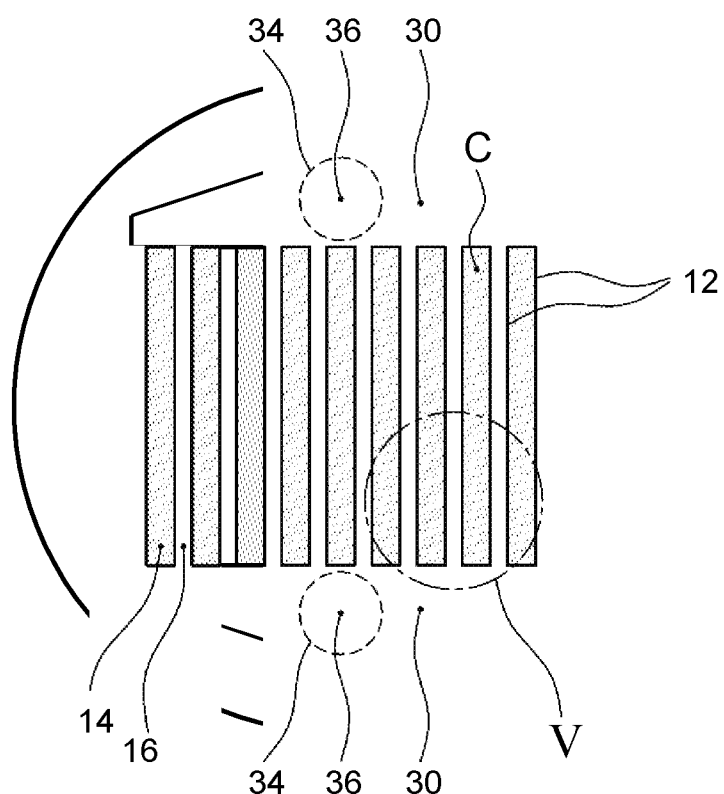
FIG. 7 shows a transversal cross sectional view of the plate heat exchanger assembly of the heat exchanger-reformer according to the invention.
Figure 8:
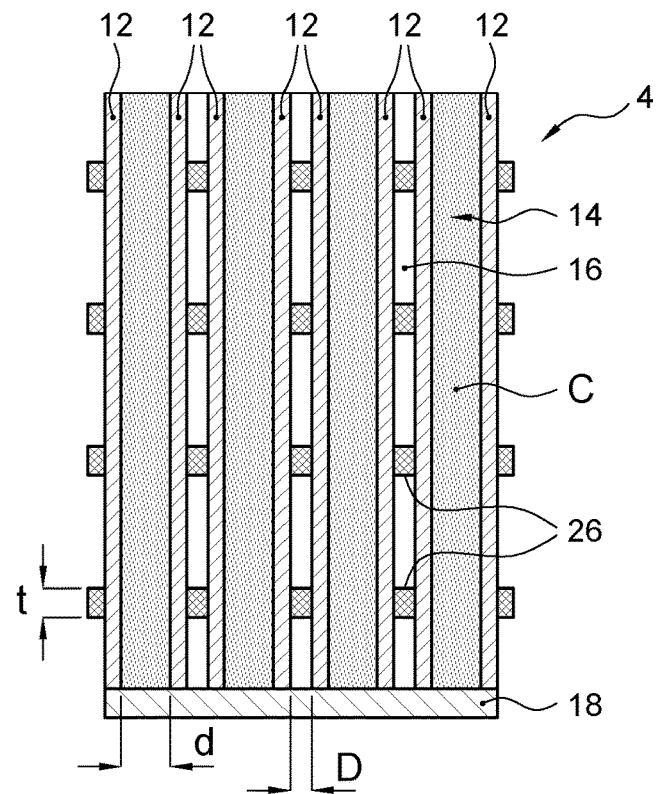
FIG. 8 shows a detail of the cross sectional view of the plate heat exchanger assembly of FIG. 4.
Figure 9:
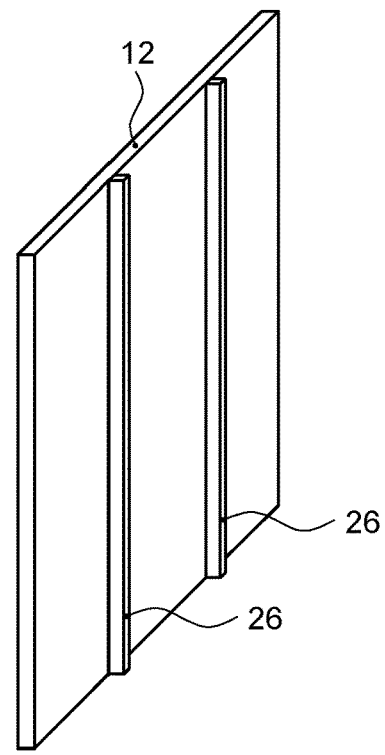
FIG. 9 shows a schematic perspective view of a single plate of the plate heat exchanger assembly of the heat exchanger-reformer according to the invention.

Adjacent a downstream end of the reformer effluent channels 16 at least one exit gas chamber 30 is provided (see FIGS. 2 and 7). In the shown embodiment two exit gas chambers 30 are provided on opposite sides of the plate heat exchanger assembly 4. In the respective bottom walls 32 (see FIG. 2) of the exit gas chambers 30 outlet openings 34 are provided. Exit gas headers 36 are provided in fluid connection with said outlet openings 34 for conducting the reformer effluent out of the heat exchanger-reformer 1 and for supplying the reformer effluent to a process gas boiler P provided downstream of the heat exchanger-reformer 1 according to the invention.

Since the heat exchanging section of the heat exchanger-reformer 1 according to the invention does not comprise a tube sheet, the associated scale-up fabrication limits that are dictated by size (diameter and thickness) of said tube sheet are not an issue with the heat exchanger-reformer 1 according to the invention.

In another embodiment the hot reformed gas is supplied to the heat exchanger reformer 200 for heat exchange with the fresh hydrocarbon feed stream which is subjected to steam reforming. The FIG. 3 represent an embodiment of the heat exchanger where the equipment is designed with a horizontal layout. It should be noted that vertical layout is possible as well.

The heat exchanger reformer 200 according to the invention comprises a vessel 202, with an elongated cylindrical shape. The vessel 202 comprises a first inlet 210 through which a hydrocarbon feed and steam mixture F is supplied. The first inlet 210 is provided at a first end of the vessel 206 of the vessel 202.

The feed and steam supply F may be pre-treated to remove unwanted feed contaminants and the hydrocarbon feed may be mixed with steam and pre heated, and optionally pre-reformed.

A second inlet 212 for supplying the reformed gas, or in other words hot reformer effluent is provided at the second end 208 of the vessel 202. The second inlet 212 may be in fluid connection with the reformed gas outlet of the main steam methane reformer M, or the secondary reformer M or the partial oxidation reactor M to allow for a direct supply of reformer effluent (i.e. the reformed gas), to the vessel 202 inner space.

Inside the vessel 202 a heat exchanging section is provided which allows for exchanging heat between the hydrocarbon feed and steam mixture which is supplied to the first end of the vessel and the hot reformer effluent supplied to second end of the vessel. The feed and hot reformer effluent are provided to flow in counter-current direction.

The heat exchanging section comprises a plate heat exchanger assembly 204. The plate heat exchanger assembly 204 comprises several plates positioned at a distance from each other to provide alternating first and second channels 14, 16 between adjacent plates (see also FIGS. 5, 7-9). The first channels 14 are configured for a feed and steam mixture flow in a first direction R1, said first direction extending from the first inlet 210 in the first end of the vessel 202 in direction to the second end of the vessel 208. The second channels 16 are configured for a flow of reformer effluent in a second direction R2, opposite direction to the first direction R1. Thus, in use, the flow of reformer effluent through the plate heat exchanging assembly 204 is in counter flow with the feed and steam mixture flow.

The first channels 14 comprise at an opening thereof facing the first inlet 210 of the vessel 202 a catalyst channel inlet 20, for instance a diffuser type inlet (not shown) for suitable flow distribution. The catalyst is preferably coated on the plates but may also be provided as packing structures or pellets.

The second channels 16 have an inlet opening facing the reformer effluent inlet 212 (see FIG. 3) for receiving the reformer effluent flow. When flowing through the second channels 16, the hot reformer effluent will pass along the plates 12 and exchange heat with plates 12 and the feed/steam mixture flowing through channels 14. In order to have a suitable distribution of the reformer effluent inlet, a perforated plate 224 may be provided for finely dividing the reformer effluent flow towards the inlet openings of the second channels 16 (see FIG. 2). Plate 224 may enable bottom mixed flow distribution. In the second end 208 of the vessel 202, a refractory shroud 238, for instance a cylindrical, rectangular or hexagonal shroud, may be provided.

Adjacent to the first end of the reformer 200 and at the end of effluent channels 16 at least one exit gas chamber 230 is provided (see FIG. 3). In the shown embodiment one exit gas chamber 230 is provided on one side of the plate heat exchanger assembly 204. In the respective walls 232 of the exit gas chambers 230 outlet opening 236 is provided. Exit gas header 236 conducts the reformer effluent out of the heat exchanger-reformer 200 and for supplying the reformer effluent P1 to an optional process gas boiler before the shift section provided downstream of the heat exchanger-reformer 200 according to the invention.

Adjacent to the second end of the reformer 200 and at the end of catalyst containing channels 14 at least one exit gas chamber 234 is provided (see FIG. 3). In the shown embodiment one exit gas chamber 234 is provided on one side of the plate heat exchanger assembly 204. In the respective walls 233 of the exit gas chambers 234 outlet opening 237 is provided. Exit gas header 237 conducts the reformate out of the heat exchanger-reformer 200 and for supplying the reformer effluent P2 towards the steam reformer or secondary reformer or partial oxidation reactor, or to mix it with the cooled reformer effluent P1.

In still another embodiment the hot reformed gas is supplied to the heat exchanger reformer 300 for heat exchange with the fresh hydrocarbon feed stream which is subjected to steam reforming. The FIG. 4 represents an embodiment of the heat exchanger where the equipment is designed with a vertical layout. It should be noted that horizontal layout is possible as well.

The heat exchanger reformer 300 according to the invention comprises a vessel 302, with an elongated cylindrical shape. The vessel 302 comprises a first inlet 310 through which a hydrocarbon feed and steam mixture F is supplied. The first inlet 310 is provided at a first end of the vessel 306 of the vessel 302.

The feed and steam supply F may be pre-treated to remove unwanted feed contaminants and the hydrocarbon feed may be mixed with steam and pre heated, and optionally pre-reformed.

A second inlet 312 for supplying the reformed gas, or in other words hot reformer effluent is provided at the second end 308 of the vessel 302. The second inlet 312 may be in fluid connection with the reformed gas outlet of the main steam methane reformer M, or the secondary reformer M or the partial oxidation reactor M to allow for a direct supply of reformer effluent (i.e. the reformed gas), to the vessel 202 inner space.

Inside the vessel 302 a heat exchanging section is provided which allows for exchanging heat between the hydrocarbon feed and steam mixture which is supplied to the first end of the vessel and the hot reformer effluent supplied to second end of the vessel. The feed and hot reformer effluent are provided to flow in counter-current direction.

The heat exchanging section comprises a plate heat exchanger assembly 304. The plate heat exchanger assembly 304 comprises several plates positioned at a distance from each other to provide alternating first and second channels 114, 115 between adjacent plates as well as channels 116 that are provided within the channels 114 (see also FIG. 6). The first channels 114 are configured for a feed and steam mixture flow in a first direction R1, said first direction extending from the first inlet 310 in the first end of the vessel 302 in direction to the second end of the vessel 308. The additional channels 115 are provided within the channel 114 and are used for heat internal heat recovery. The heat of the reformate is indeed transferred back towards the catalytic zone. In this way the high grade heat of the reformate is fully utilized for the endothermic reforming reaction. Reformate flows back towards the first end 306 of the vessel 302 in the direction R2. The second channels 115 are configured for a flow of reformer effluent in a second direction R2, opposite direction to the first direction R1. Thus, in use, the flow of reformer effluent through the plate heat exchanging assembly 304 is in counter flow with the feed and steam mixture flow.

The first channels 114 comprise an addition couple of plates that form the channel 116 with which it is fluidly connected.

The second channels 115 have an inlet opening facing the reformer effluent inlet 312 (see FIG. 4) for receiving the reformer effluent flow. When flowing through the second channels 115, the hot reformer effluent will pass along the plates and exchange heat with plates and the feed/steam mixture flowing through channels 114. In order to have a suitable distribution of the reformer effluent inlet, a perforated plate 324 may be provided for finely dividing the reformer effluent flow towards the inlet openings of the second channels 115 (see FIG. 2). Plate 324 may enable bottom mixed flow distribution. In the second end 308 of the vessel 302, a refractory shroud 338, for instance a cylindrical, rectangular or hexagonal shroud, may be provided.

Adjacent to the first end of the reformer 300 and at the end of effluent channels 115 at least one exit gas chamber 330 is provided (see FIG. 4). In the shown embodiment one exit gas chamber 330 is provided on one side of the plate heat exchanger assembly 304. In the respective walls 332 of the exit gas chambers 330 outlet opening 336 is provided. Exit gas header 336 conducts the reformer effluent out of the heat exchanger-reformer 300 and for supplying the reformer effluent P1 to an optional process gas boiler before the shift section provided downstream of the heat exchanger-reformer 300 according to the invention. The exit gas header 336 is in fluid connection with the plate extensions 123 that allow for cross flow transport of the effluent from the end of the plate assembly 332 to the outlet 336 of the reactor vessel 302.

Adjacent to the first end of the reformer 300 another exit gas chamber 330 is provided (see FIG. 4). In the shown embodiment one exit gas chamber 334 is provided on one side of the plate heat exchanger assembly 204. In the respective walls 332 of the exit gas chambers 334 outlet opening 337 is provided. Exit gas header 337 conducts the reformate out of the heat exchanger-reformer 300 and for supplying the reformer effluent P2 towards the steam reformer or secondary reformer or partial oxidation reactor, or to mix it with the cooled reformer effluent P1. The outlet 337 opening maybe typically at the opposite side of the vessel 302 compared to the outlet 336. The plate extensions 124 extending the additional inner channel 116 allowing for cross flow routing of the reformate towards outlet 337 allow for counter current flow of the reformate compared to the effluent flow in the plate extension 123.

Although illustrative embodiments of the present invention have been described above, in part with reference to the accompanying drawings, it is to be understood that the invention is not limited to these embodiments. Variations to the disclosed embodiments can be understood and effected by those skilled in the art in practicing the claimed invention, from a study of the drawings, the disclosure, and the appended claims. It will be clear, for example, that the dimensions, shape and configuration of the plate heat exchanger assembly may vary dependent on the kind of heat exchanger-reformer.

The invention claimed is:

1. A heat exchanger reformer for convective steam reforming of a hydrocarbon feed, wherein the heat exchanger reformer comprises a vessel having a plate assembly section placed therein comprising of several plates separated by a gap from each other, the gap between adjacent plates providing at least alternating first and second channels between adjacent plates, which vessel comprises a first inlet at a first end of the plate assembly section for supplying a mixture of a hydrocarbon feed and steam to the first channels and causing the mixture to flow in a direction toward a second end of the plate assembly section, which vessel also comprises a second inlet close to the second end of the plate assembly for supplying hot reformer effluent as a heating gas flow to the second channels, wherein the second channels comprise a first and a second section which are connected to each other, wherein the first section is provided for conducting the hot reformer effluent in a direction towards the first end of the plate assembly counter current to the flow of the hydrocarbon feed and steam mixture in the first channels, and the second section is provided for conducting the hot reformer effluent to flow in cross direction of the first channels, which second channels are connected to a collector outlet for the reformer effluent to leave the heat exchanger reformer at the first end of the plate assembly.

2. A heat exchanger reformer according to claim 1, wherein the first channels comprise a first and a second part, which first and second part run along each other and are separated from each other by means of a separation wall.

3. A heat exchanger reformer according to claim 2, wherein the first and second part of the first channels extend parallel to each other.

4. A heat exchanger-reformer according to claim 1, wherein a face of a plate facing the second channel is provided with at least one protrusion, which protrudes into the second channel over at least part of the width of the second channel, which protrusion extends along the flowing direction of an effluent within the second channel, along at least part of the length of the plate.

5. A heat exchanger-reformer according to claim 4, which protrusion comprises at least one ridge, which protrudes into the second channel for the reformer effluent gas and extends along the flowing direction of the effluent within the second channel.

6. A heat exchanger reformer according to claim 5, wherein the at least one ridge is provided to connect adjacent plates forming the second channel.

7. A heat exchanger reformer according to claim 4, wherein the plates at a side facing the at least one second channel are corrugated.

8. A heat exchanger reformer according to claim 4, wherein the ridge has a thickness in width direction of the second channel which is maximal half of the width of the second channel.

9. A heat exchanger reformer according to claim 1, wherein the collector outlet is provided for conducting the reformer effluent to an outlet nozzle of the vessel.

10. A heat exchanger reformer according to claim 1, wherein the first channels contain a reforming catalyst.

11. A heat exchanger reformer according to claim 1, wherein the first and second channels run parallel.

12. A heat exchanger reformer according to claim 1, wherein the plate assembly section is placed in an enclosing shell.

13. A heat exchanger reformer according to claim 1, wherein the hot reformer effluent is mixed in the vessel with an effluent exiting the first channels, wherein the second channels are connected to a collector outlet at an extension of the second channels for an effluent exiting the second channels to leave the heat exchanger-reformer, wherein the collector is provided for conducting a received reformer effluent to an outlet nozzle of the vessel before exiting the vessel as a single product stream out of the heat exchanger reformer vessel.

14. A heat exchanger reformer according to claim 1, wherein an effluent from the second channels is collected in extended ducts at the first end of the plate assembly to leave the heat exchanger-reformer at a second extension of the second channels of the plate assembly, while an effluent exiting the first channels is collected at the second end of the plate assembly in a collector outlet to leave the heat exchanger-reformer at a first extension of the first channels of the plate assembly, wherein at the first extension a first collector is provided and at the second extension a second collector is provided for conducting the effluent from the second channels and the effluent exiting the first channel to separate outlet nozzles of the vessel to provide separate streams leaving the vessel.

15. A heat exchanger reformer according to claim 1, wherein an effluent from the second channels is collected in extended ducts at the first end of the plate assembly to leave the heat exchanger-reformer at a second extension of the second channels, wherein an effluent exiting the first channels is directed counter-current to the flow direction in the second channels through an additional channel positioned in the first channel and collected in an extension to the additional channel at the first end of the plate assembly, at each of the first and second extension at least one collector is provided for conducting the effluents to a separate outlet nozzle of the vessel to provide separate streams leaving the vessel.

16. A heat exchanger reformer according to claim 1, wherein the vessel comprises a box positioned on top of the plate assembly section, which box is provided with a plurality of supply holes at the position of the first channels for supplying the mixture of hydrocarbon feed and steam to the first channels.

17. A heat exchanger reformer according to claim 1, wherein the inlet for providing the mixture of hydrocarbon feed and steam to the second channels comprises a diffuser type feed inlet.

18. A heat exchanger reformer according to claim 1, wherein the plates are coated with a protective coating at least on a side facing the at least one second channel.

19. A heat exchanger reformer according to claim 1, wherein the plates of the plate assembly section are made of an alloy that provides resistance to metal dusting.

20. A heat exchanger reformer according to claim 1, wherein the vessel extends in upright direction, wherein the first inlet for supplying the mixture of a hydrocarbon feed and steam is arranged in an upper part of the vessel and the second inlet for the reformer effluent is arranged in a lower part of the vessel.

21. A heat exchanger reformer according to claim 1, wherein the first inlet for supplying the mixture of hydrocarbon feed and steam to the first channels is a diffuser type feed inlet.

22. A heat exchanger reformer according to claim 1, wherein the plate assembly comprises on opposite sides thereof a first and a second end plate, which have a larger thickness in comparison to the plates delimiting the first and second channels.

23. A heat exchanger reformer according to claim 1, wherein the second end of the plate assembly is located on a side of the plate assembly opposite the side comprising the first end.

24. A heat exchanger reformer according to claim 1, wherein said second section of the second channels is provided by extensions of the second channels.

25. A syngas production plant for producing syngas by means of a steam methane reforming method, wherein the syngas production plant comprises a main steam methane reformer and a heat exchanger-reformer according to claim 1, wherein the heat exchanger-reformer is positioned downstream of the main steam methane reformer, wherein the main steam reformer is configured for reforming of hydrocarbon to produce syngas and wherein the heat exchanger-reformer is configured for reforming of hydrocarbon to produce additional syngas.

26. A method for producing syngas, wherein the method comprises a main steam methane reforming step in which hydrocarbon is reformed to produce syngas and a heat exchanger-reforming step in which hydrocarbon is reformed to produce additional hydrogen, wherein the heat exchanger-reforming step is carried out in a heat exchanger-reformer according to claim 1.

27. A method according to claim 26, wherein the syngas is produced by steam methane reforming.

* * * * *